United States Patent
Cheethirala et al.

(10) Patent No.: US 7,881,325 B2
(45) Date of Patent: Feb. 1, 2011

(54) LOAD BALANCING TECHNIQUE IMPLEMENTED IN A STORAGE AREA NETWORK

(75) Inventors: Madhava Rao Cheethirala, San Jose, CA (US); Raja Rao Tadimeti, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1057 days.

(21) Appl. No.: 11/116,604

(22) Filed: Apr. 27, 2005

(65) Prior Publication Data

US 2006/0245361 A1 Nov. 2, 2006

(51) Int. Cl.
H04L 12/56 (2006.01)

(52) U.S. Cl. .................. 370/422; 370/392; 370/235

(58) Field of Classification Search .............. None
See application file for complete search history.

(56) References Cited

U.S. PATENT DOCUMENTS

| | | | |
|---|---|---|---|
| 6,754,751 B1 | 6/2004 | Willke | |
| 6,819,654 B2 * | 11/2004 | Soloway et al. | 370/238 |
| 6,950,848 B1 * | 9/2005 | Yousefi'zadeh | 709/203 |
| 7,506,074 B2 * | 3/2009 | Venkatanarayan et al. | 709/250 |
| 2002/0154645 A1 | 10/2002 | Hu et al. | |
| 2003/0065944 A1 * | 4/2003 | Mao et al. | 713/201 |
| 2005/0018673 A1 * | 1/2005 | Dropps et al. | 370/389 |
| 2005/0047334 A1 * | 3/2005 | Paul et al. | 370/229 |
| 2005/0053073 A1 | 3/2005 | Kloth et al. | |
| 2005/0117562 A1 * | 6/2005 | Wrenn | 370/351 |
| 2005/0281196 A1 * | 12/2005 | Tornetta et al. | 370/235 |
| 2006/0023725 A1 * | 2/2006 | Makishima et al. | 370/398 |
| 2006/0262784 A1 | 11/2006 | Cheethirala et al. | |
| 2008/0159171 A1 * | 7/2008 | Banks et al. | 370/254 |

OTHER PUBLICATIONS

Information Technology Industry Council, Fibre Channel Switch Fabric-3 (FC-SW-3) Rev. 6.6, Dec. 19, 2003.
Information Technology Industry Council, Fibre Channel-Generic Services-4 (FC-GS-4) Rev 7.8, Jan. 12, 2004.
International Search Report and Written Opinion, mailed on Oct. 10, 2007 for PCT/US06/16038.
US Office Action dated Dec. 8, 2008 from U.S. Appl. No. 11/134,742; 5 pgs.
Notice of Allowance and Allowed Claims dated Apr. 6, 2009 from U.S. Appl. No. 11/134,742; 17 pgs.

* cited by examiner

*Primary Examiner*—Daniel J Ryman
*Assistant Examiner*—Tito Pham
(74) *Attorney, Agent, or Firm*—Weaver Austin Villeneuve & Sampson LLP (57) ABSTRACT

A technique is disclosed for managing load balancing operations in a storage area network. A frame is received at a switch in the fibre channel fabric. According to a specific implementation, the frame includes header information including a source device identity and a destination device identity. Zone and/or flow information relating to the identity of the zone/flow which is associated with the frame is identified. Using the identified information, a load balancing mechanism to be used for handling the frame is selected. According to a specific implementation, the selection of the load balancing mechanism is based at least in part upon the identity of the zone and/or flow which is associated with the frame.

27 Claims, 5 Drawing Sheets

|  | Zone ID (402) | Members (404) | Attributes (406) |
|---|---|---|---|
| 401a → | A | H1, D1 | Flow based LB, etc. |
| 401b → | B | H2, D2 | Exchange based LB, etc. |
| 401c → | C | H1, D1, D2 | Flow based LB, etc. |
|  | ⋮ | ⋮ | ⋮ |

Fig. 4   400

|  | Flow ID (502) | Members (504) | Attributes (506) |
|---|---|---|---|
| 501a → | SID1-DID1 | H1, D1 | Flow based LB, etc. |
| 501b → | SID2-DID1 | H2, D1 | Exchange based LB, etc. |
| 501c → | SID1-DID2 | H1, D2 | Exchange based LB, etc. |
| 501d → | SID2-DID2 | H2, D2 | Exchange based LB, etc. |

LOAD BALANCING TECHNIQUE IMPLEMENTED IN A STORAGE AREA NETWORK

CROSS REFERENCE TO RELATED APPLICATION

This application is related to U.S. patent application Ser. No. 11/134,742 entitled "TECHNIQUE FOR IN ORDER DELIVERY OF TRAFFIC ACROSS A STORAGE AREA NETWORK," by Cheethirala et al., filed on May 19, 2005.

BACKGROUND OF THE INVENTION

1. Field of the Invention

The present invention relates to storage area networks, and more particularly, to an apparatus and method for an improved technique for implementing load balancing in a storage area network.

2. Background of the Invention

With the increasing popularity of Internet commerce and network centric computing, businesses and other organizations are becoming more and more reliant on information. To handle all of this data, storage area networks or SANs have become very popular. A SAN typically includes a number of storage devices, a plurality of Hosts, and a number of Switches arranged in a Switching Fabric that connects the storage devices and the Hosts.

Most SANs rely on the Fibre Channel protocol for communication within the Fabric. For a detailed explanation of the Fibre Channel protocol and Fibre Channel Switching Fabrics and Services, see the following publications: ANSI INCITS 373-2003, Fibre Channel Framing and Signaling Interface (FC-FS); ANSI INCITS 384-2004, Fibre Channel-Switch Fabric-3 (FC-SW-3); and ANSI INCITS 387-2004, Fibre Channel-Generic Services-4 (FC-GS-4); all of which are incorporated herein by reference for all purposes.

In conventional Fibre Channel, each device (e.g., hosts, storage devices and switches) is identified by an unique eight (8) byte wide Node_Name assigned by the manufacturer. When the Fibre Channel devices are interconnected to form a SAN, the Node_Name (along with other parameters) is used to identify each device. Fibre Channel frames are used for communication among the devices in the SAN. The Node_Name, however, is not used by the frames. Instead the Fibre Channel Port of each end device (hosts and storage devices) is addressed via a three (3) byte Fibre Channel address (or FCID), allocated dynamically to the end devices by the fabric. A unique FCID is assigned to a host device or disk device when the device logs in to the fabric. Additionally, each switch in the fabric is assigned a specific domain by the domain manager when the switch is connected to the fabric. All the devices connected to a given switch will have the DomainID of the switch as the first byte of their FCIDs. This "Domain" value is used for routing the frames within the fabric. Each FC frame header will include an SID field representing the source FCID, and a DID field representing the destination FCID.

Fibre Channel based SANs are often organized into zones. Within each zone, Hosts can see and access only storage devices or other Hosts belonging to that zone. This allows the coexistence on the same SAN of different computing environments. Additionally, zoning allows the partition of a Fibre Channel fabric into smaller fabrics to allow the implementation of features such as security and restrictions. Devices belonging to a single functional group are typically placed under the same zone. For example, devices involved in online transactions can be placed in one zone while devices associated with backing up user data can be placed in another zone. The SAN administrator may define in a SAN multiple zones, as required or dictated by the computing and storage resources connected to it. The Switching Fabric allows communications only between devices belonging to the same zone, preventing a device of one zone from seeing or accessing a device of another zone.

Recently, new technology referred to as Virtual SANs or VSANs have been implemented in order to enhance fabric scalability and availability, and further augment the security services offered by fabric zoning. VSANs combined with hardware-enforced zoning provide the SAN designer with new tools to highly optimize SAN deployments in terms of scalability, availability, security and management. VSANs provide the ability to create completely isolated fabric topologies, each with its own set of fabric services, on top of a scalable common physical infrastructure. As each VSAN possesses its own zoning service, zoning is then configured within each VSAN independently and has no affect on any other VSAN and zoning service.

Load balancing is a technique used in Fibre Channel networks to distribute the traffic load across multiple possible paths to the same destination. Load balancing is typically used to utilize the network bandwidth efficiently and to recover from the link failures. However, conventional load balancing techniques which are currently implemented in Fibre Channel fabrics suffer from a variety of limitations, such as, for example, those relating to granularity and configuration. For example, conventional load balancing techniques typically require that all switches within the VSAN fabric be configured to utilize the same load balancing protocol. Thus, one limitation relates to the need for a more granular way to configure load balancing mechanisms in Fibre Channel networks. Additionally, load balancing configuration on the FC fabric switches typically cannot be enforced across the fabric unless each switch in the fabric is configured individually with the same load balancing parameters. Since there are conventionally no standard protocols by which the load balancing configurations are able to be automatically propagated across the fabric, configuration or reconfiguration of load balancing parameters across the entire FC fabric becomes a burdensome and resource intensive task.

Accordingly, it will be appreciated that there exists a need for improving load balancing techniques implemented in Fibre Channel networks.

SUMMARY OF THE INVENTION

Various aspects of the present invention are directed to different methods, systems, and computer program products for managing load balancing operations in a storage area network which includes at least one host device adapted to communicate with at least one storage device via a fibre channel fabric. In at least one implementation, the fibre channel fabric includes at least one switch. A first frame is received at the switch. According to a specific implementation, the first frame includes header information including a source device identity and a destination device identity. The first frame is also associated with a first flow in the storage area network. First zone information relating to the identity of the first zone which is associated with the first frame is identified. Using the identified first zone information, a first load balancing mechanism to be used for handling the first frame is selected. According to a specific implementation, the selection of the first load balancing mechanism is based at least in part upon the identity of the first zone which is associated with the first frame. Using the first load balancing mechanism, a first path is then selected for forwarding the first frame to the destination device.

According to at least one embodiment, a second frame may also received at the switch. In one implementation, the second frame includes header information including a source device identity and a destination device identity. The second frame is also associated with a second flow in the storage area network. Second zone information relating to the identity of the second zone which is associated with the second frame is identified. Using the identified second zone information, a second load balancing mechanism to be used for handling the second frame is selected. According to a specific implementation, the selection of the second load balancing mechanism is based at least in part upon the identity of the second zone which is associated with the second frame. Using the second load balancing mechanism, a second path is then selected for forwarding the second frame to the destination device. According to one implementation, the first load balancing mechanism may correspond to a flow based load balancing mechanism, and the second load balancing mechanism may correspond to an exchange based load balancing mechanism.

Additional aspects of the present invention are directed to different methods, systems, and computer program products for managing load balancing operations in a storage area network which includes at least one host device adapted to communicate with at least one storage device via a fibre channel fabric. In at least one implementation, the fibre channel fabric includes at least one switch. A first frame is received at the switch. According to a specific implementation, the first frame includes header information including a source device identity and a destination device identity. The first frame is also associated with a first flow in the storage area network. First flow information relating to the identity of the first flow which is associated with the first frame is identified. Using the identified first flow information, a first load balancing mechanism to be used for handling the first frame is selected. According to a specific implementation, the selection of the first load balancing mechanism is based at least in part upon the identity of the first flow which is associated with the first frame. Using the first load balancing mechanism, a first path is then selected for forwarding the first frame to the destination device.

According to at least one embodiment, a second frame may also received at the switch. In one implementation, the second frame includes header information including a source device identity and a destination device identity. The second frame is also associated with a second flow in the storage area network. Second flow information relating to the identity of the second flow which is associated with the second frame is identified. Using the identified second flow information, a second load balancing mechanism to be used for handling the second frame is selected. According to a specific implementation, the selection of the second load balancing mechanism is based at least in part upon the identity of the second flow which is associated with the second frame. Using the second load balancing mechanism, a second path is then selected for forwarding the second frame to the destination device. According to one implementation, the first load balancing mechanism may correspond to a flow based load balancing mechanism, and the second load balancing mechanism may correspond to an exchange based load balancing mechanism.

Additional objects, features and advantages of the various aspects of the present invention will become apparent from the following description of its preferred embodiments, which description should be taken in conjunction with the accompanying drawings.

DETAILED DESCRIPTION OF THE PREFERRED EMBODIMENTS

The present invention describes various mechanisms which may be used for improving load balancing techniques in Fibre Channel networks.

Figure 1:
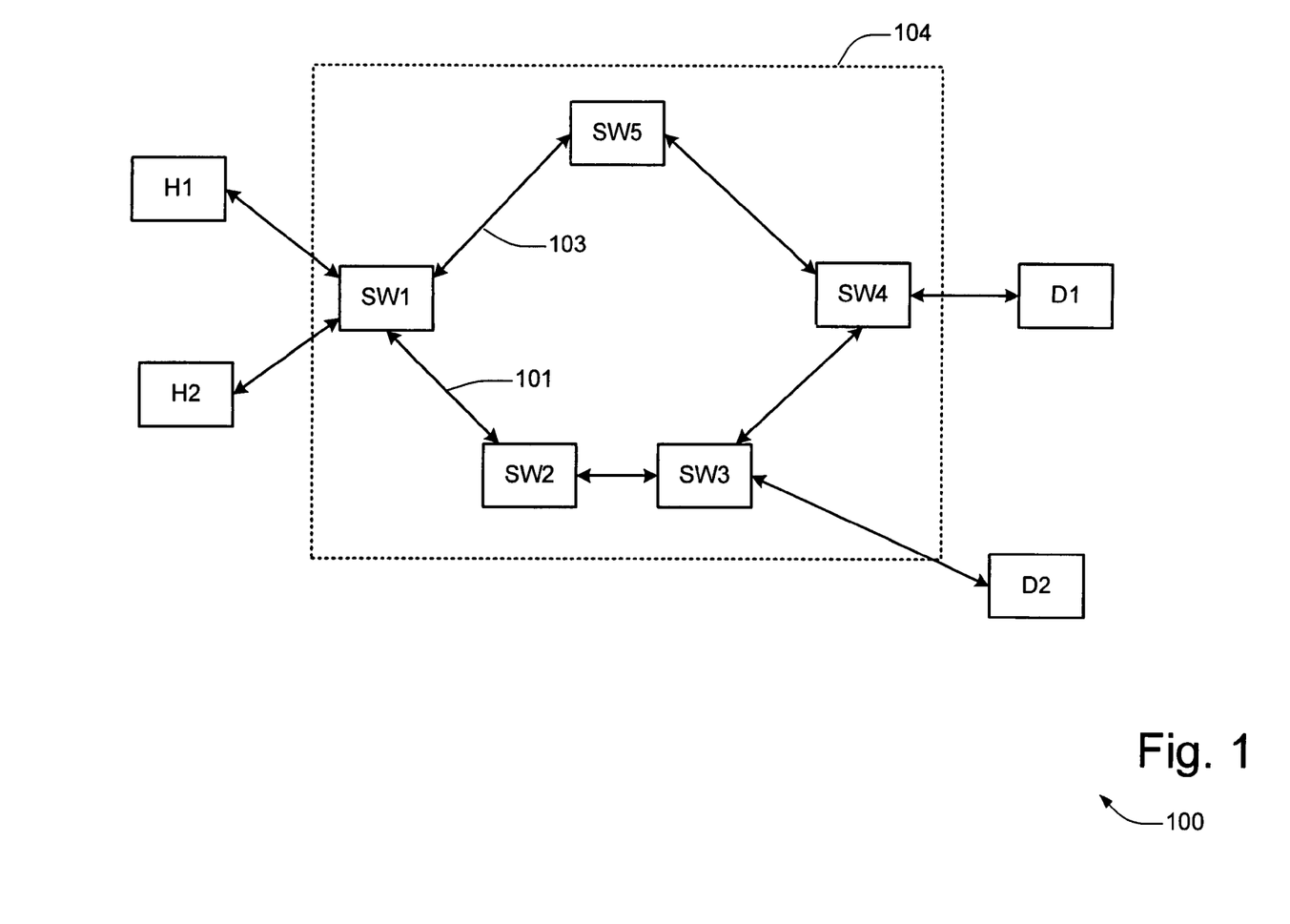
FIG. 1 shows a block diagram of a portion 100 of a Fibre Channel network.

FIG. 1 shows a block diagram of a portion 100 of a Fibre Channel network. As illustrated in the example of FIG. 1, the Fibre Channel network includes a plurality of hosts (H1, H2), a plurality of discs or storage devices (D1, D2), and a VSAN fabric 104 which includes a plurality of switches (SW1-SW5) such as, for example, switches from the MDS line of storage switches available from Cisco Systems of San Jose, Calif. A flow between any two Fibre Channel (FC) devices may be characterized by the respective identities (e.g. FCIDs) of each device. For example, the flow H1-D1 may correspond to an exchange of frames between host H1 and storage device D1. Typically, in FC networks, a given flow is expressed in terms of the SID and DID parameters (e.g., SID-DID) associated with the frames of that flow.

According to a specific embodiment, each flow in the Fibre Channel network includes at least one exchange of one or more sequences of frames transmitted from one port to another. Each Fibre Channel sequence may represent a series of one or more related frames transmitted unidirectionally from one port to another. A Fibre Channel exchange represents a series or one or more nonconcurrent sequences between two ports. The sequences may be in either direction. As another perspective, one can use the following analogy to characterize the hierarchy of frames, sequences, and exchanges in a Fibre Channel network: frames correspond to words, sequences correspond to sentences, and exchanges correspond to conversations. Thus, for example, a Fibre Channel (FC) device may be configured or designed to "speak" more than one sentence and hold more than one "conversation" at a time with another FC device.

In the example of FIG. 1, it is assumed that the VSAN platform supports at least two different modes of load balancing mechanisms, namely flow based load balancing, and exchange based load balancing. In flow based load balancing, all frames between a given source and given destination follow the same links for a given flow. That is, whichever links are selected for the first exchange of the flow are then used for all subsequent exchanges for that particular flow. In at least one implementation, a flow may be characterized as any communication between a given source device and a given destination device. In Exchange based load balancing, on the other hand, the first frame in an exchange is assigned to a particular link, and subsequent frames in that exchange follow the same link. However, frames from subsequent exchanges of the same flow may use a different link.

In at least one embodiment, path selection for load balancing purposes may be determined using a variety of different hashing algorithms. For example, in one embodiment, path selection for flow based load balancing may be implemented using the following hash function: SID ⊕ DID % (# of paths), where ⊕=exclusive OR operation, and %=modulus operation. Alternatively, path selection for exchange based load balancing may be implemented using the following hash function: SID ⊕ DID ⊕ OXID % (# of paths), where OXID corresponds to a given exchange. In at least one implementation, the flow of based load balancing algorithm and the exchange based load balancing algorithm are each adapted to accommodate the needs of SAN devices which are sensitive to the sequential order in which frames are received. An example of such devices may include hosts or storage devices which require in-order guarantee (IOG) of frame delivery with respect to a given flow and/or exchange.

The following discussion illustrates, by way of example with reference to FIG. 1, at least some of the differences between flow based load balancing and exchange based load balancing. Initially, it will be assumed that the VSAN fabric 104 is configured to implement flow based load balancing. In this example, it is assumed that a frame is to be sent from H1 to D1, and that the hash function of the flow based load balancing algorithm at switch SW1 assigns the frame to path 103. According to the flow based load balancing technique, all subsequent frames relating to flow H1-D1 will also be routed via path 103. As can be appreciated, this flow of based load balancing technique limits the full network utilization of routes since, for example, if all network traffic is related to flow H1-D1, only half the network bandwidth will be utilized in transporting the traffic relating to this flow.

Exchange based load balancing is able to provide more granular load balancing, and hence better utilization of available bandwidth. For example, using the example above, it will now be assumed that the VSAN fabric 104 is configured to implement exchange based load balancing. In this example, it is assumed that a frame relating to a first exchange (e.g., OXID1) is to be sent from H1 to D1, and that the hash function of the exchange based load balancing algorithm at switch SW1 assigns the frame to path 103. According to the exchange based load balancing technique, all subsequent frames relating to flow H1-D1 and exchange OXID1 will also be routed via path 103. However, subsequent frames relating to flow H1-D1 but not associated with exchange OXID1 may be routed by the exchange based load balancing algorithm via either path 101 or 103. Thus, it will be appreciated that exchange based load balancing may provide for more efficient utilization of available bandwidth.

However, some applications, devices, and/or protocols cannot function properly in the presence of exchange based load balancing mechanisms. For example, one such protocol commonly referred to as FC-Write acceleration requires that all frames traveling between a given source and a given destination take the same path. Thus, for example, if the flow H1-D1 is utilizing FC-Write acceleration, then all frames relating to that flow would be required to travel along the same path from source to destination. Moreover, in order to provide end-to-end load balancing, the same load balancing parameters should preferably be configured on all the switches across the VSAN fabric. As a result, exchange based load balancing could not be utilized in the VSAN fabric 104. Since the VSAN fabric 104 is used to provide connectivity between hosts H1, H2 and disks D1, D2, none of the flows involving H1-D2, H2-D1, H2-D2 would be able to use exchange based load balancing. Thus, according to conventional techniques, for example, if one or more of the devices in a VSAN is not capable of supporting exchange based load balancing, the entire VSAN fabric should preferably be configured in flow based load balancing mode, despite the fact that other devices within the VSAN may be capable of supporting exchange based load balancing.

According to at least one embodiment, the present invention provides a solution to the above-described problems by employing a technique which may be used to achieve improved granularity with respect to SAN or VSAN load balancing configurations. For example, according to one implementation, zoning information may be used as a classifier for defining and/or determining appropriate load balancing parameters for various flows in a SAN or VSAN. Such a technique provides a relatively simple way to specify load balancing capabilities at the zone level of granularity. According to one embodiment, the zoning information may include information relating to Zone Attribute Objects, defined, for example, in FC-GS-4 and FC-SW-3.

Figure 2:
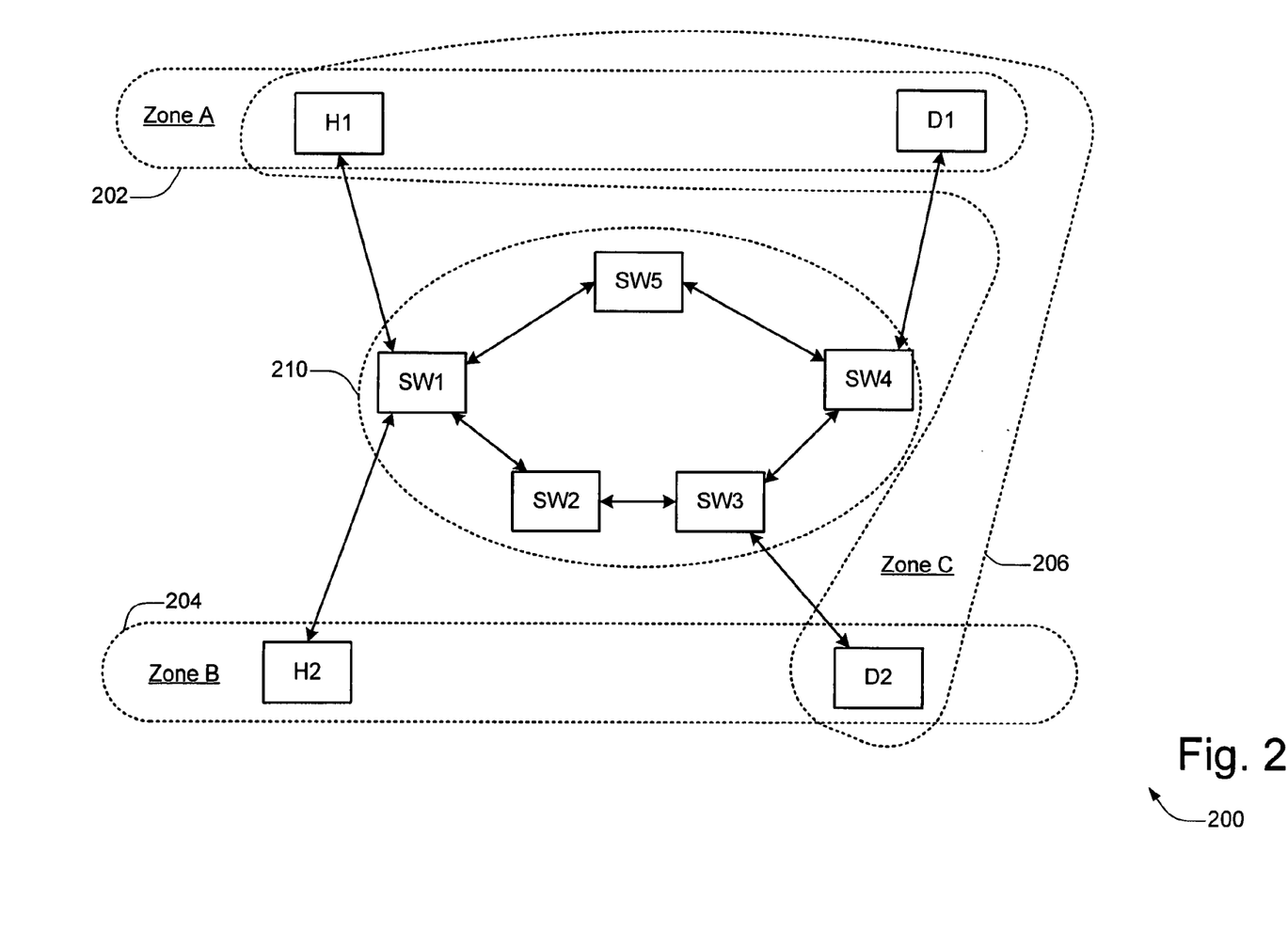
FIG. 2 shows a block diagram of a specific embodiment of a storage area network portion 200, which may be used for illustrating various aspects of the present invention.

FIG. 2 shows a block diagram of a specific embodiment of a storage area network portion 200, which may be used for illustrating various aspects of the present invention. In the example of FIG. 2, the storage area network 200 has been organized into a plurality of different zones. Zone A 202 includes members H1 and D1; Zone B 204 includes members H2 and D2; and Zone C 206 includes members H1, D1, and D2. The storage area network of FIG. 2 represents a simplified model which may be used for purposes of illustrating various aspects of the present invention. However, it will be appreciated that the techniques of the present invention as described herein may be implemented in a variety of other network configurations generally known to one having ordinary skill in the art.

A specific embodiment of the zone-flow based load balancing technique of the present invention will now be described by way of example with reference to FIG. 2 of the drawings. In this example, it is assumed that the flow relating to H1-D1 utilizes FC-Write acceleration, and that none of the other permitted flows (e.g., H1-D2, H2-D2) in the network utilize FC-Write acceleration. According to conventional load balancing techniques, the use of FC-Write acceleration at flow H1-D1 would result in the entire Fibre Channel fabric 210 being configured to implement flow based load balancing. However, in at least one embodiment of the present invention, the zone attributes of the storage area network 200 may be used as a classifier in order to determine the appropriate load balancing algorithm (e.g., flow based load balancing, exchange based load balancing, etc.) to be used for flows associated with each respective zone. Thus, for example, using the technique of the present invention, the storage area network of FIG. 2 may be configured as follows. A flow based load balancing algorithm may be used for flows associated with Zone A since this zone includes possible H1-D1 flows. Additionally, a flow based load balancing algorithm may also be used for flows associated with Zone C since this zone includes possible H1-D1 flows. However, an exchange based load balancing algorithm may be used for flows associated with Zone B since this zone will not include any H1-D1 flows. Thus it can be seen that the zone-flow based load balancing technique of the present invention provides a mechanism for specifying load balancing capabilities/attributes at the zone level of granularity.

Figure 4:
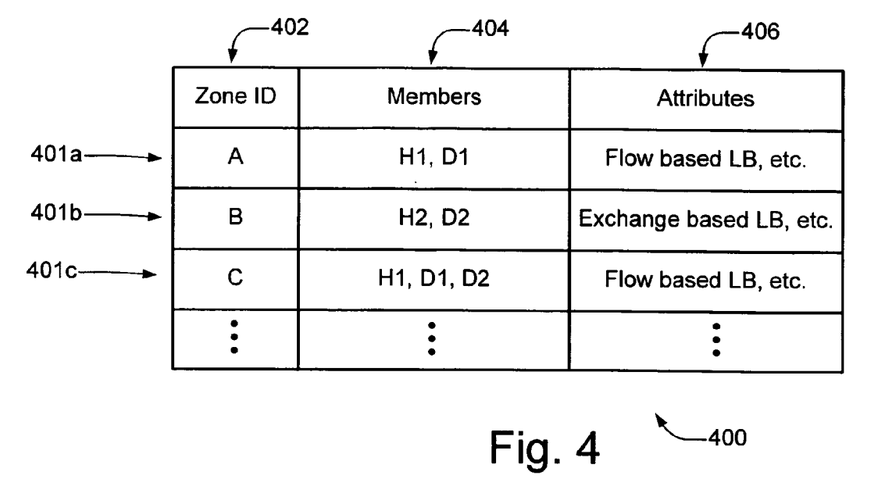
FIGS. 4 and 5 of the drawings illustrate examples of different data structures 400, 500 which may be used for facilitating the improved load balancing techniques of the present invention.

FIG. 4 shows a representation of a portion of a data structure 400 (herein referred to as a Zone Attribute Table) which may be used for facilitating the improved load balancing techniques of the present invention. In at least one embodiment, a separate instance of the data structure illustrated in FIG. 4 may reside in memory such as, for example, the local memory of one or more switches of the Fibre Channel fabric. As illustrated in the example of FIG. 4, Zone Attribute Table 400 includes a plurality of entries 401a-c. Each entry in the table includes information relating to a variety of different parameters such as, for example, zone ID information 402, zone member information 404, zone attribute information 406, etc. For example, entry 401a includes parameters and/or other information relating to Zone A (e.g., 202 of FIG. 2) such as, for example, the SAN devices (e.g., H1, D1) which are members of Zone A, attribute information associated with Zone A, etc. In a specific implementation, the attribute information 406 may include one or more Zone Attribute Objects (e.g., Protocol, Broadcast Zone, Hard Zone, Vendor Specified, QoS, etc.) as defined, for example, in FC-GS-4 and FC-SW-3. Additionally, as illustrated in FIG. 4, the attribute information 406 may also include load balancing information relating to the type or mode of load balancing technique to be implemented for traffic associated with that particular zone (e.g., Zone A). For example, entry 401a specifies that flow based load balancing is to be implemented for traffic associated with Zone A; entry 401b specifies that exchange based load balancing is to be implemented for traffic associated with Zone B (e.g., 204 of FIG. 2); entry 401c specifies that flow based load balancing is to be implemented for traffic associated with Zone C (e.g., 206 of FIG. 2), etc.

One of the benefits of utilizing zone attribute objects (such as those defined, for example, in the FC-GS-4 and FC-SW-3 standards) to specify load balancing parameters as a zone attribute is that such an implementation is able to leverage the use of the existing zone distribution mechanisms to automatically propagate the load balancing configurations across the FC fabric, thereby obviating the need to manually configure load balancing parameters on each switch in the FC fabric, and obviating the need to provide new mechanisms to support distribution of load balancing configuration in the fabric. Thus, in at least one implementation, the technique of the present invention provides a policy and mechanism for implementing zone based load balancing granularity across a SAN using the zoning configuration and distribution mechanism. Such a technique also enhances the utility of zoning. Moreover, by configuring load balancing parameters on a zone basis, network administrators are able to fine tune the network to make more effective use of the network bandwidth.

According to at least one embodiment, the technique of the present invention may also be used to distribute a per-VSAN load balancing attribute across the FC fabric. In one implementation, the zoning-based load balancing attribute may use the VSAN load balancing attribute as the default load balancing configuration, for example, in situations where the zoning-based attribute has not been set. In this way, a user or network administrator need not have to make use of this level of granularity, for example, in simple environment where such levels of granularity are not needed.

According to an alternate embodiment of the present invention, the level of granularity for specifying load balancing capabilities/attributes in a Fibre Channel storage area network may be further refined by using flow-related information as a classifier for defining and/or determining the appropriate load balancing algorithm to be used for traffic relating to a given flow. For example, applying at this alternate embodiment to the example of FIG. 2 as described above, the storage area network of FIG. 2 may be configured as follows: a flow based load balancing algorithm may be used for traffic associated with H1-D1 flows, an exchange based load balancing algorithm may be used for traffic associated with H1-D2 flows, and an exchange based load balancing algorithm may be used for traffic associated with H2-D2 flows.

Figure 5:
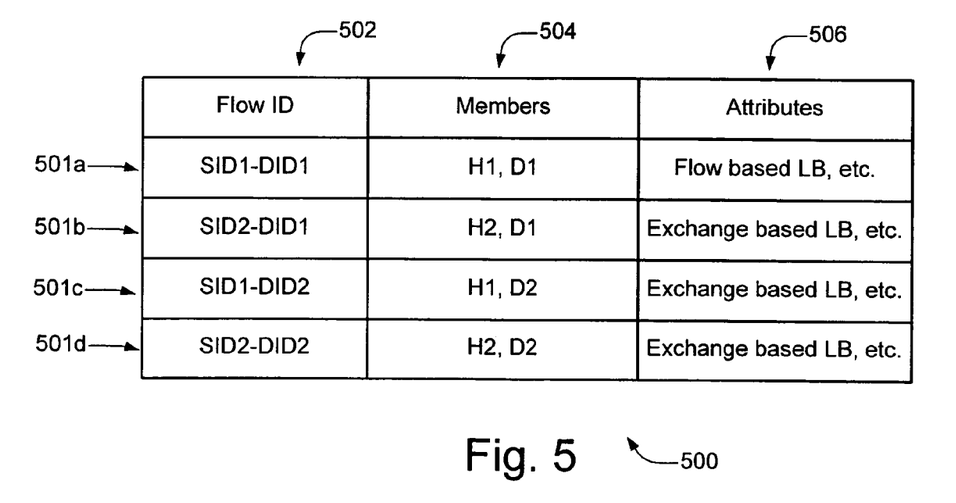

FIG. 5 shows a representation of a portion of a data structure 500 (herein referred to as a Flow Attribute Table) which may be used for facilitating the improved load balancing techniques of the present invention. In at least one embodiment, a separate instance of the data structure illustrated in FIG. 5 may reside in memory such as, for example, the local memory of one or more switches of the Fibre Channel fabric. As illustrated in the example of FIG. 5, Flow Attribute Table 500 includes a plurality of entries 501a-d. Each entry in the table includes information relating to a variety of different parameters such as, for example, flow ID information 502, flow member information 504, flow attribute information 506, etc. For example, entry 501a includes parameters and/or other information relating to the flow H1-D1, which, in this example corresponds to the flow ID: SID1-DID1. In a specific implementation, the attribute information 506 may include load balancing information relating to the type or mode of load balancing technique to be implemented for traffic associated with that particular flow (e.g., SID1-DID1). For example, entry 501a specifies that flow based load balancing is to be implemented for traffic associated with flow SID1-DID1; entry 501b specifies that exchange based load balancing is to be implemented for traffic associated with flow SID2-DID1 (e.g., H2-D1 of FIG. 2); entry 501c specifies that exchange based load balancing is to be implemented for traffic associated with flow SID1-DID2 (e.g., H1-D2 of FIG. 2); etc. Although not illustrated in FIG. 5, other types of attribute information may include, for example, a "no load balancing" attribute for specifying that no load balancing is to be performed on traffic associated with a given flow; a "manual path configuration" attribute for specifying a predetermined path to be used for traffic associated with a given flow; etc.

Figure 3:
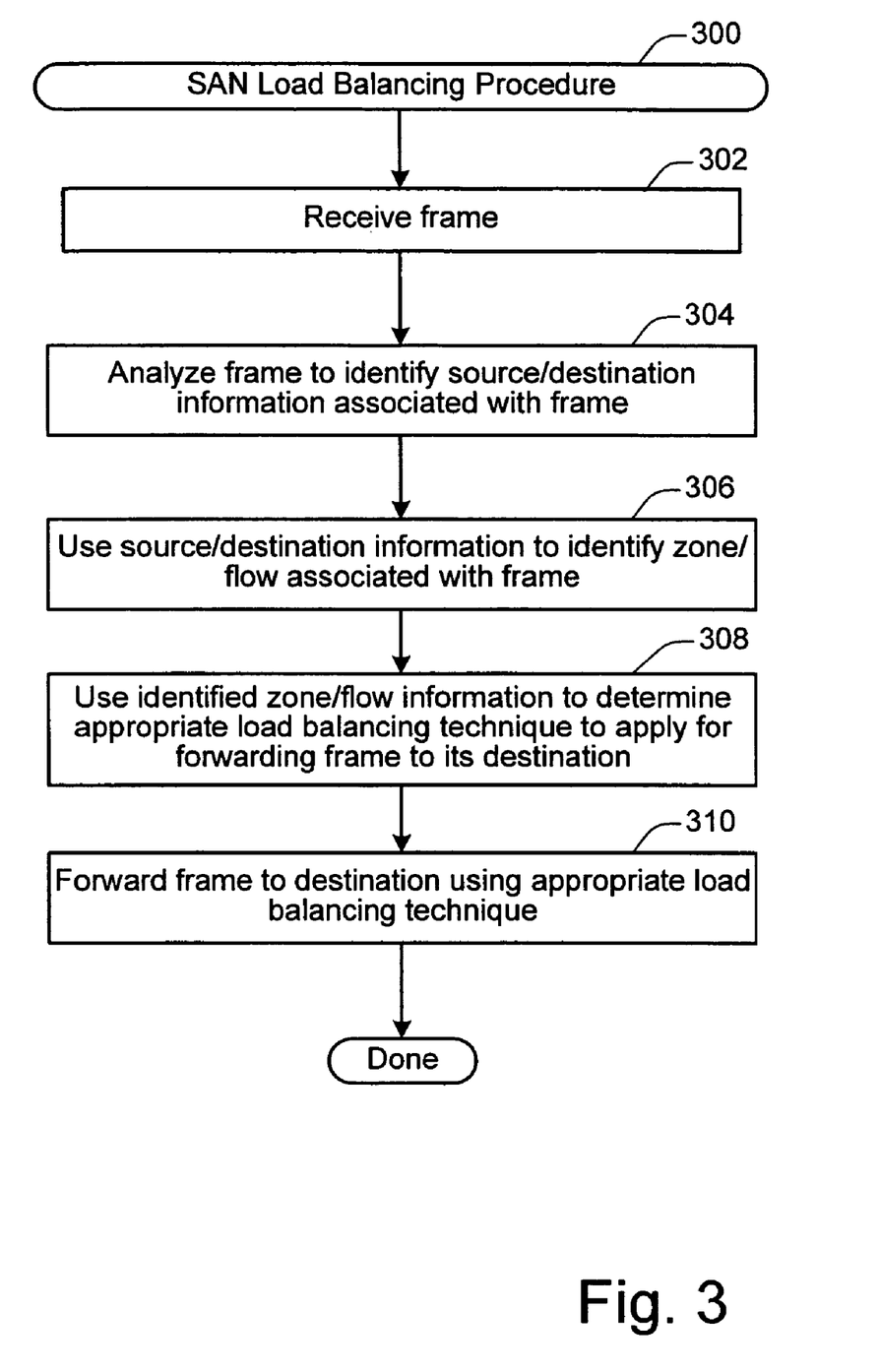
FIG. 3 shows a flow diagram of a SAN Load Balancing Procedure 300 in accordance with a specific embodiment of the present invention.

FIG. 3 shows a flow diagram of a SAN Load Balancing Procedure 300 in accordance with a specific embodiment of the present invention. According to at least one implementation, one or more instances of the SAN Load Balancing Procedure may be implemented at each switch or selected switches within the SAN or VSAN fabric. For purposes of illustration, the SAN Load Balancing Procedure of FIG. 3 will now be described by way of example with reference to FIG. 2 of the drawings. In this example, it is assumed of that the SAN Load Balancing Procedure has been implemented at switch SW1 of FIG. 2. When a frame is received (302) at switch SW1, the frame is analyzed (302) or classified in order to identify the source/destination information associated with that frame. In at least one implementation, this analysis may occur during a classification phase of the traffic handling operations performed at switch SW1. In at least one embodiment, the source/destination information may corresponds to the SID and DID information contained within the frame header. In a specific embodiment, the received frame is classified in order to identify its associated flow, which, for example, may be expressed in terms of SID-DID.

As shown at 306, the identified source/destination information of the received frame may then be used to identify the zone and/or flow associated with that frame. For example, in one implementation, the identified source/destination information of the received frame may be used to identify the zone associated with that frame. In an alternate implementation, the identified source/destination information of the received frame may be used to identify the flow associated with that frame. According to at least one embodiment, identification of the appropriate zone and/or flow associated with a given frame may be facilitated, for example, by referencing information stored in at least one data structure such as, for example, at least one of the data structures illustrated in FIGS. 4 and 5 of the drawings. According to a specific embodiment, any conflicts in the zone identification for a particular flow (e.g., one flow belonging to multiple zones) may be resolved in a manner which results in the selection of the "more conservative" load balancing technique that provides better overall functionality, which, for example, may correspond to the flow based load balancing technique.

Upon identifying the flow and/or zone information and associated with the received frame, the appropriate load balancing mode to be used for forwarding the frame to its destination may then be determined (308). According to at least one embodiment, identification of the appropriate zone and/or flow associated with a given frame may be facilitated, for example, by referencing information stored in at least one data structure such as, for example, at least one of the data structures illustrated in FIGS. 4 and 5 of the drawings.

For example, in one implementation where the zone is used as the load balancing classifier, information in the Zone Attribute Table of FIG. 4 may be referenced in order to determine the appropriate load balancing mode to be implemented. Thus, referring to the Zone Attribute Table of FIG. 4, if the switch SW1 (of FIG. 2) receives a frame which has been identified as being associated with Zone A, the SAN Load Balancing Procedure may determine that a flow based load balancing algorithm is to be used for handling the received frame. Alternatively, if the switch SW1 (of FIG. 2) receives a frame which has been identified as being associated with Zone B, the SAN Load Balancing Procedure may determine that an exchange based load balancing algorithm is to be used for handling the received frame.

In an alternate implementation where the flow is used as the load balancing classifier, information in the Flow Attribute Table of FIG. 5 may be referenced in order to determine the appropriate load balancing mode to be implemented. Thus, referring to the Flow Attribute Table of FIG. 5, if the switch SW1 (of FIG. 2) receives a frame which has been identified as being associated with Flow SID1-DID1 (i.e., H1-D1), the SAN Load Balancing Procedure may determine that a flow based load balancing algorithm is to be used for handling the received frame. Alternatively, if the switch SW1 (of FIG. 2) receives a frame which has been identified as being associated with flow SID2-DID1 (i.e., H2-D1), the SAN Load Balancing Procedure may determine that an exchange based load balancing algorithm is to be used for handling the received frame.

Once the appropriate load balancing algorithm has been selected, the received frame may then be forwarded (310) to its destination using the selected load balancing algorithm.

Figure 6:
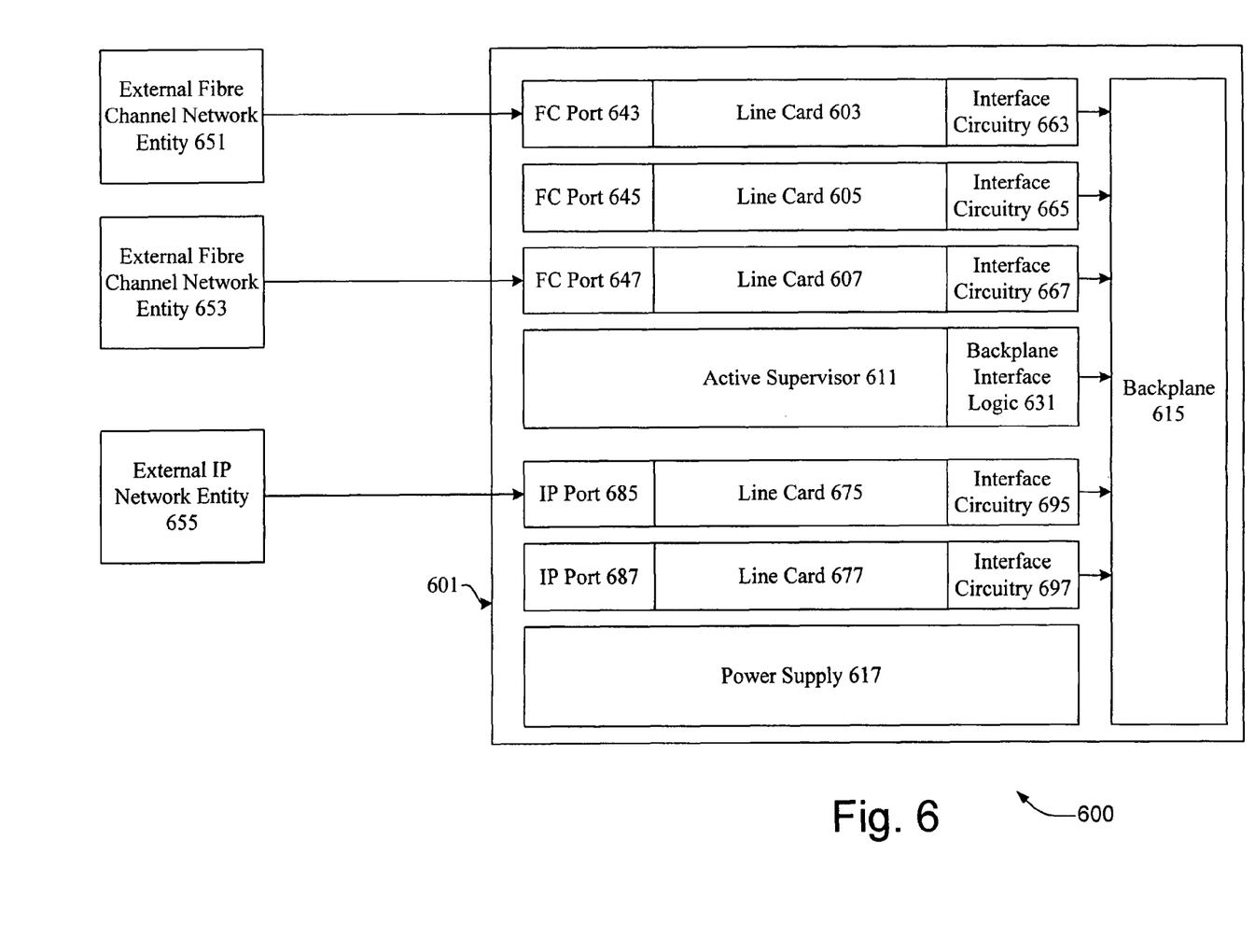
FIG. 6 is a diagrammatic representation of one example of a Fibre Channel switch that can be used to implement techniques of the present invention.

FIG. 6 is a diagrammatic representation of one example of a Fibre Channel switch that can be used to implement techniques of the present invention. Although one particular configuration will be described, it should be noted that a wide variety of switch and router configurations are available. The switch 601 may include one or more supervisors 611 and power supply 617. According to various embodiments, the supervisor 611 has its own processor, memory, and storage resources.

Line cards 603, 605, and 607 can communicate with an active supervisor 611 through interface circuitry 663, 665, and 667 and the backplane 615. According to various embodiments, each line card includes a plurality of ports that can act as either input ports or output ports for communication with external Fibre Channel network entities 651 and 653. The backplane 615 can provide a communications channel for all traffic between line cards and supervisors. Individual line cards 603 and 607 can also be coupled to external Fibre Channel network entities 651 and 653 through Fibre Channel ports 643 and 647.

External Fibre Channel network entities 651 and 653 can be nodes such as other Fibre Channel switches, disks, RAIDS, tape libraries, or servers. The Fibre Channel switch can also include line cards 675 and 677 with IP ports 685 and 687. In one example, IP port 685 is coupled to an external IP network entity 655. The line cards 675 and 677 also have interfaces 695 and 697 to the backplane 615.

It should be noted that the switch can support any number of line cards and supervisors. In the embodiment shown, only a single supervisor is connected to the backplane 615 and the single supervisor communicates with many different line cards. The active supervisor 611 may be configured or designed to run a plurality of applications such as routing, domain manager, system manager, and utility applications. The supervisor may include one or more processors coupled to interfaces for communicating with other entities.

According to one embodiment, the routing application is configured to provide credits to a sender upon recognizing that a packet has been forwarded to a next hop. A utility application can be configured to track the number of buffers and the number of credits used. A domain manager application can be used to assign domains in the Fibre Channel storage area network. Various supervisor applications may also be configured to provide functionality such as flow control, credit management, load balancing, quality of service (QoS) functionality, etc. for various Fibre Channel protocol layers.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

It is claimed:

1. A method for managing load balancing operations in a storage area network, the storage area network including at least one host device which is configured to communicate with at least one storage device via a fibre channel fabric, the fibre channel fabric including at least one switch, the method comprising:

receiving a first frame at a first switch of the fibre channel fabric, the first frame including header information including a source device identity and a destination device identity, the first frame being associated with a first flow;

identifying first zone information relating to an identity of a first zone of the storage area network which is associated with the first frame;

selecting from a plurality of different load balancing processes, using the identified first zone information, a first load balancing process for use in forwarding the first frame, wherein the plurality of different load balancing processes includes the first load balancing process and a second load balancing process different from the first load balancing process, and wherein the selection of the first load balancing process is based at least in part upon the identity of the first zone associated with the first frame, wherein each of the plurality of different load balancing processes operates to distribute traffic across multiple paths in the storage area network to the destination device;

forwarding, using the selected first load balancing process, the first frame to the destination device, wherein the forwarding of the first frame includes selecting a first path for forwarding the first frame to the destination device, wherein the first path includes a communication link to at least one other network device in the storage area network;

receiving a second frame at the first switch of the fibre channel fabric, identifying second zone information relating to an identity of a second zone of the storage area network which is associated with the second frame;

selecting from the plurality of different load balancing processes, using the identified second zone information, the second load balancing process for use in forwarding the second frame, wherein the selection of the second load balancing process is based at least in part upon the identity of the second zone associated with the second frame; and forwarding, using the selected second load balancing process, the second frame to the destination device, wherein the forwarding of the second frame includes selecting a second path for forwarding the second frame to the destination device, wherein the second path includes a communication link to at least one other network device in the storage area network;

wherein the first load balancing process corresponds to a flow based load balancing process which is configured or designed to cause frames from different exchanges, which relate to the first flow and which are received at the first switch, to be forwarded via the first path to the destination device; and wherein the second load balancing process corresponds to an exchange based load balancing process which is configured or designed to allow frames from different exchanges, which relate to the first flow and which are received at the first switch, to be forwarded via different selected paths to the destination device.

2. The method of claim 1 further comprising using an automated mechanism to propagate load balancing configuration information across the fibre channel fabric.

3. The method of claim 1 further comprising:

using an automated mechanism to propagate load balancing configuration information across the fibre channel fabric;

wherein the load balancing configuration information is embedded within Zone Attribute information which is automatically distributed to switches across the fibre channel fabric.

4. The method of claim 1 further comprising:

accessing load balancing configuration information stored within a first field of a Zone Attribute Object; and using the load balancing configuration information to determine the selection of the first load balancing process.

5. The method as recited in claim 1, wherein the first zone of the storage area network includes the source device and the destination device.

6. The method as recited in claim 1, wherein the plurality of load balancing processes includes one or more flow based load balancing processes and one or more exchange based load balancing processes.

7. A method for managing load balancing operations in a storage area network, the storage area network including at least one host device which is configured to communicate with at least one storage device via a fibre channel fabric, the fibre channel fabric including at least one switch, the method comprising:

receiving a first frame at a first switch of the fibre channel fabric, the first frame including header information including a source device identity and a destination device identity, the first frame being associated with a first flow;

identifying first flow information relating to an identity of a first flow associated with the first frame;

selecting from a plurality of different load balancing processes, using the identified first flow information, a first load balancing process for use in forwarding the first frame, wherein the plurality of different load balancing processes includes the first load balancing process and a second load balancing process different from the first load balancing process, and wherein the selection of the first load balancing process is based at least in part upon the identity of the first flow associated with the first frame, wherein each of the plurality of different load balancing processes operates to distribute traffic across multiple paths in the storage area network to the destination device; and forwarding, using the selected first load balancing process, the first frame to the destination device, wherein the forwarding of the first frame includes selecting a first path for forwarding the first frame to the destination device, wherein the first path includes a communication link to at least one other network device in the storage area network;

receiving a second frame, identifying second flow information relating to an identity of a second flow of the storage area network which is associated with the second frame;

selecting from the plurality of different load balancing processes, using the identified second flow information, the second load balancing process for use in forwarding the second frame, wherein the selection of the second load balancing process is based at least in part upon the identity of the second flow associated with the second frame; and forwarding, using the selected second load balancing process, the second frame to the destination device, wherein the forwarding of the second frame includes selecting a second path for forwarding the second frame to the destination device, wherein the second path includes a communication link to at least one other network device in the storage area network;

wherein the first load balancing process corresponds to a flow based load balancing process which is configured or designed to cause frames from different exchanges, which relate to the first flow and which are received at the first switch, to be forwarded via the first path to the destination device; and wherein the second load balancing process corresponds to an exchange based load balancing process which is configured or designed to allow frames from different exchanges, which relate to the first flow and which are received at the first switch, to be forwarded via different selected paths to the destination device.

8. The method of claim 7 further comprising using an automated mechanism to propagate load balancing configuration information across the fibre channel fabric.

9. A system for managing load balancing operations in a storage area network, the storage area network including at least one host device which is configured to communicate with at least one storage device via a fibre channel fabric, the fibre channel fabric including at least one switch, the system comprising:

at least one processor;

at least one interface configured or designed to provide a communication link to at least one other network device in the network; and memory;

means for receiving a first frame at a first switch of the fibre channel fabric, the first frame including header information including a source device identity and a destination device identity, the first frame being associated with a first flow;

means for identifying first zone information relating to an identity of a first zone of the storage area network which is associated with the first frame;

means for selecting from a plurality of different load balancing processes, using the identified first zone information, a first load balancing process for use in forwarding the first frame, wherein the plurality of different load balancing processes includes the first load balancing process and a second load balancing process different from the first load balancing process, and wherein the selection of the first load balancing process is based at least in part upon the identity of the first zone associated with the first frame; and means for forwarding, using the selected first load balancing process, the first frame to the destination device, wherein the forwarding of the first frame includes selecting a first path for forwarding the first frame to the destination device, the first path including a communication link to at least one other network device in the network;

means for receiving a second frame at the first switch of the fibre channel fabric, means for identifying second zone information relating to an identity of a second zone of the storage area network which is associated with the second frame;

means for selecting from the plurality of different load balancing processes, using the identified second zone information, the second load balancing process for use in forwarding the second frame, wherein the selection of the second load balancing process is based at least in part upon the identity of the second zone associated with the second frame;

means for forwarding, using the selected second load balancing process, the second frame to the destination device, wherein the forwarding of the second frame includes selecting a second path for forwarding the second frame to the destination device, the second path including a communication link to at least one other network device in the network;

wherein the first load balancing process corresponds to a flow based load balancing process which is configured or designed to cause frames from different exchanges, which relate to the first flow and which are received at the first switch, to be forwarded via the first path to the destination device; and wherein the second load balancing process corresponds to an exchange based load balancing process which is configured or designed to allow frames from different exchanges, which relate to the first flow and which are received at the first switch, to be forwarded via different selected paths to the destination device.

10. A system for managing load balancing operations in a storage area network, the storage area network including at least one host device which is configured to communicate with at least one storage device via a fibre channel fabric, the fibre channel fabric including at least one switch, the system comprising:

at least one processor;

at least one interface configured or designed to provide a communication link to at least one other network device in the network; and memory;

means for receiving a first frame at a first switch of the fibre channel fabric, the first frame including header information including a source device identity and a destination device identity, the first frame being associated with a first flow;

means for identifying first flow information relating to an identity of a first flow of the storage area network which is associated with the first frame;

means for selecting from a plurality of different load balancing processes, using the identified first flow information, a first load balancing process for use in forwarding the first frame, wherein the plurality of different load balancing processes includes the first load balancing process and a second load balancing process different from the first load balancing process, and wherein the selection of the first load balancing process is based at least in part upon the identity of the first flow associated with the first frame; and means for forwarding, using the selected first load balancing process, the first frame to the destination device, wherein the forwarding of the first frame includes selecting a first path for forwarding the first frame to the destination device, the first path including a communication link to at least one other network device in the network;

means for receiving a second frame at the first switch of the fibre channel fabric, means for identifying second flow information relating to an identity of a second flow of the storage area network which is associated with the second frame;

means for selecting from the plurality of different load balancing processes, using the identified second flow information, the second load balancing process for use in forwarding the second frame, wherein the selection of the second load balancing process is based at least in part upon the identity of the second flow associated with the second frame;

means for forwarding, using the selected second load balancing process, the second frame to the destination device, wherein the forwarding of the second frame includes selecting a second path for forwarding the second frame to the destination device, the second path including a communication link to at least one other network device in the network;

wherein the first load balancing process corresponds to a flow based load balancing process which is configured or designed to cause frames from different exchanges, which relate to the first flow and which are received at the first switch, to be forwarded via the first path to the destination device; and wherein the second load balancing process corresponds to an exchange based load balancing process which is configured or designed to allow frames from different exchanges, which relate to the first flow and which are received at the first switch, to be forwarded via different selected paths to the destination device.

11. A non-transitory computer-readable medium storing thereon computer-readable instructions for managing load balancing operations in a storage area network, the storage area network including at least one host device which is configured to communicate with at least one storage device via a fibre channel fabric, the fibre channel fabric including at least one switch, wherein the instructions, when executed, cause a processor to perform the following steps:

identifying first zone information relating to an identity of a first zone of the storage area network which is associated with a first frame received at a first switch of the fibre channel fabric, the first frame including header information including a source device identity and a destination device identity, the first frame being associated with a first flow;

selecting from a plurality of different load balancing processes, using the identified first zone information, a first load balancing process for use in forwarding the first frame, wherein the plurality of different load balancing processes includes the first load balancing process and a second load balancing process different from the first load balancing process, and wherein the selection of the first load balancing process is based at least in part upon the identity of the first zone associated with the first frame, wherein each of the plurality of different load balancing processes operates to distribute traffic across multiple paths in the storage area network to the destination device;

forwarding, using the selected first load balancing process, the first frame to the destination device, wherein the forwarding of the first frame includes selecting a first path for forwarding the first frame to the destination device, wherein the first path includes a communication link to at least one other network device in the storage area network;

identifying second zone information relating to an identity of a second zone of the storage area network which is associated with a second frame received at the first switch of the fibre channel fabric, selecting from the plurality of different load balancing processes, using the identified second zone information, the second load balancing process for use in forwarding the second frame, wherein the selection of the second load balancing process is based at least in part upon the identity of the second zone associated with the second frame; and forwarding, using the selected second load balancing process, the second frame to the destination device, wherein the forwarding of the second frame includes selecting a second path for forwarding the second frame to the destination device, wherein the second path includes a communication link to at least one other network device in the storage area network;

wherein the first load balancing process corresponds to a flow based load balancing process which is configured or designed to cause frames from different exchanges, which relate to the first flow and which are received at the first switch, to be forwarded via the first path to the destination device; and wherein the second load balancing process corresponds to an exchange based load balancing process which is configured or designed to allow frames from different exchanges, which relate to the first flow and which are received at the first switch, to be forwarded via different selected paths to the destination device.

12. The non-transitory computer-readable medium as recited in claim 11, wherein the first zone includes the source device and the destination device.

13. The non-transitory computer-readable medium as recited in claim 11, wherein the plurality of load balancing processes include two or more flow based load balancing processes and two or more exchange based load balancing processes.

14. A non-transitory computer-readable medium storing thereon computer-readable instructions for managing load balancing operations in a storage area network, the storage area network including at least one host device which is configured to communicate with at least one storage device via a fibre channel fabric, the fibre channel fabric including at least one switch, wherein the instructions, when executed, cause a processor to perform the following steps:

identifying first flow information relating to an identity of a first flow associated with a first frame received at a first switch of the fibre channel fabric, the first frame including header information including a source device identity and a destination device identity, the first frame being associated with a first flow;

selecting from a plurality of different load balancing processes, using the identified first flow information, a first load balancing process for use in forwarding the first frame, wherein the plurality of different load balancing processes includes the first load balancing process and a second load balancing process different from the first load balancing process, and wherein the selection of the first load balancing process is based at least in part upon the identity of the first flow associated with the first frame, wherein each of the plurality of different load balancing processes operates to distribute traffic across multiple paths in the storage area network to the destination device; and forwarding, using the selected first load balancing process, the first frame to the destination device, wherein the forwarding of the first frame includes selecting a first path for forwarding the first frame to the destination device, wherein the first path includes a communication link to at least one other network device in the storage area network;

identifying second flow information relating to an identity of a second flow of the storage area network which is associated with a second frame that has been received;

selecting from the plurality of different load balancing processes, using the identified second flow information, the second load balancing process for use in forwarding the second frame, wherein the selection of the second load balancing process is based at least in part upon the identity of the second flow associated with the second frame; and forwarding, using the selected second load balancing process, the second frame to the destination device, wherein the forwarding of the second frame includes selecting a second path for forwarding the second frame to the destination device, wherein the second path includes a communication link to at least one other network device in the storage area network;

wherein the first load balancing process corresponds to a flow based load balancing process which is configured or designed to cause frames from different exchanges, which relate to the first flow and which are received at the first switch, to be forwarded via the first path to the destination device; and wherein the second load balancing process corresponds to an exchange based load balancing process which is configured or designed to allow frames from different exchanges, which relate to the first flow and which are received at the first switch, to be forwarded via different selected paths to the destination device.

15. The non-transitory computer-readable medium as recited in claim 14, wherein the plurality of load balancing processes include two or more flow based load balancing processes and two or more exchange based load balancing processes.

16. A fibre channel switch of a storage area network, the storage area network including at least one host device which is configured to communicate with at least one storage device via a fibre channel fabric, the switch comprising:

at least one processor;

at least one interface configured or designed to provide a communication link to at least one other network device in the network; and memory;

at least one of the processor and the memory being configured or designed to receive a first frame, the first frame including header information including a source device identity and a destination device identity, the first frame being associated with a first flow;

at least one of the processor and the memory being configured or designed to identify first zone information relating to an identity of a first zone of the storage area network which is associated with the first frame;

at least one of the processor and the memory being configured or designed to select from a plurality of different load balancing processes, using the identified first zone information, a first load balancing process for use in forwarding the first frame, wherein the plurality of different load balancing processes includes the first load balancing process and a second load balancing process different from the first load balancing process, and wherein the selection of the first load balancing process is based at least in part upon the identity of the first zone associated with the first frame, wherein each of the plurality of different load balancing processes operates to distribute traffic across multiple paths in the storage area network to the destination device;

at least one of the processor and the memory being configured or designed to forward, using the selected first load balancing process, the first frame to the destination device, wherein the forwarding of the first frame includes selecting a first path for forwarding the first frame to the destination device, wherein the first path includes a communication link to at least one other network device in the storage area network;

at least one of the processor and the memory being configured or designed to receiving a second frame at the first switch of the fibre channel fabric;

at least one of the processor and the memory being configured or designed to identify second zone information relating to an identity of a second zone of the storage area network which is associated with the second frame;

at least one of the processor and the memory being configured or designed to select from the plurality of different load balancing processes, using the identified second zone information, the second load balancing process for use in forwarding the second frame, wherein the selection of the second load balancing process is based at least in part upon the identity of the second zone associated with the second frame; and at least one of the processor and the memory being configured or designed to forward, using the selected second load balancing process, the second frame to the destination device, wherein the forwarding of the second frame includes selecting a second path for forwarding the second frame to the destination device, wherein the second path includes a communication link to at least one other network device in the storage area network;

wherein the first load balancing process corresponds to a flow based load balancing process which is configured or designed to cause frames from different exchanges, which relate to the first flow and which are received at the first switch, to be forwarded via the first path to the destination device; and wherein the second load balancing process corresponds to an exchange based load balancing process which is configured or designed to allow frames from different exchanges, which relate to the first flow and which are received at the first switch, to be forwarded via different selected paths to the destination device.

17. The switch of claim 16 being further configured or designed to use an automated mechanism to propagate load balancing configuration information across the fibre channel fabric.

18. The switch of claim 16 being further configured or designed to:

use an automated mechanism to propagate load balancing configuration information across the fibre channel fabric;

wherein the load balancing configuration information is embedded within Zone Attribute information which is automatically distributed to switches across the fibre channel fabric.

19. The switch of claim 16 being further configured or designed to:

access load balancing configuration information stored within a first field of a Zone Attribute Object; and use the load balancing configuration information to determine the selection of the first load balancing process.

20. The switch of claim 16 wherein said at least one processor is configured to store in said memory at least one data structure, including:

Zone Attribute information relating to at least one zone of the storage area network;

the Zone Attribute information including load balancing configuration information;

the switch being configured or designed to use the load balancing configuration information to determine the selection of the load balancing process to be used for forwarding the first frame.

21. The switch of claim 16 wherein said at least one processor is configured to store in said memory at least one data structures, including:

a zone attribute data structure including zone information relating to zone identities of at least a portion of zones in the storage area network;

wherein each of the selected zone identities has associated therewith a respective load balancing configuration attribute which specifies a specific one of a plurality of load balancing processes to be used for forwarding traffic associated with that zone.

22. The switch of claim 16, wherein the first zone includes the source device and the destination device.

23. The switch as recited in claim 16, wherein the plurality of load balancing processes includes two or more flow based load balancing processes and two or more exchange based load balancing processes.

24. A fibre channel switch of a storage area network, the storage area network including at least one host device which is configured to communicate with at least one storage device via a fibre channel fabric, the switch comprising:

at least one processor;

at least one interface configured or designed to provide a communication link to at least one other network device in the network; and memory;

at least one of the processor and the memory being configured or designed to receive a first frame, the first frame including header information including a source device identity and a destination device identity, the first frame being associated with a first flow;

at least one of the processor and the memory being configured or designed to identify first flow information relating to an identity of a first flow associated with the first frame;

at least one of the processor and the memory being configured or designed to select from a plurality of different load balancing processes, using the identified first flow information, a first load balancing process for use in forwarding the first frame, wherein the plurality of different load balancing processes includes the first load balancing process and a second load balancing process different from the first load balancing process, and wherein the selection of the first load balancing process is based at least in part upon the identity of the first flow associated with the first frame, wherein each of the plurality of different load balancing processes operates to distribute traffic across multiple paths in the storage area network to the destination device;

at least one of the processor and the memory being configured or designed to forward, using the selected first load balancing process, the first frame to the destination device, wherein the forwarding of the first frame includes selecting a first path for forwarding the first frame to the destination device, wherein the first path includes a communication link to at least one other network device in the storage area network;

at least one of the processor and the memory being configured or designed to receive a second frame, at least one of the processor and the memory being configured or designed to identify second flow information relating to an identity of a second flow of the storage area network which is associated with the second frame;

at least one of the processor and the memory being configured or designed to select from the plurality of different load balancing processes, using the identified second flow information, the second load balancing process for use in forwarding the second frame, wherein the selection of the second load balancing process is based at least in part upon the identity of the second flow associated with the second frame; and at least one of the processor and the memory being configured or designed to forward, using the selected second load balancing process, the second frame to the destination device, wherein the forwarding of the second frame includes selecting a second path for forwarding the second frame to the destination device, wherein the second path includes a communication link to at least one other network device in the storage area network;

wherein the first load balancing process corresponds to a flow based load balancing process which is configured or designed to cause frames from different exchanges, which relate to the first flow and which are received at the first switch, to be forwarded via the first path to the destination device; and wherein the second load balancing process corresponds to an exchange based load balancing process which is configured or designed to allow frames from different exchanges, which relate to the first flow and which are received at the first switch, to be forwarded via different selected paths to the destination device.

25. The switch of claim 24 being further configured or designed to use an automated mechanism to propagate load balancing configuration information across the fibre channel fabric.

26. The switch of claim 24 wherein said at least one processor is configured to store in said memory at least one data structures, including:

a flow attribute data structure including flow information relating to flow identities of at least a portion of flows in the storage area network;

wherein each of the selected flow identities has associated therewith a respective load balancing configuration attribute which specifies a specific one of a plurality of load balancing processes to be used for forwarding traffic associated with that flow.

27. The switch as recited in claim 24, wherein the plurality of load balancing processes include two or more flow based load balancing processes and two or more exchange based load balancing processes.

* * * * *